United States Patent [19]

Devon

[11] Patent Number: 5,692,127
[45] Date of Patent: Nov. 25, 1997

[54] SYSTEM FOR TRANSMITTING MULTIPLE PULSES PPM CONTROL SIGNAL TO WIRELESS DEVICE TO INDICATE COLLISION IN A WIRED NETWORK WHILE PLACING DATA ON THE NETWORK

[75] Inventor: Mark Daryl Devon, San Jose, Calif.

[73] Assignee: Apple Computer, Inc., Cupertino, Calif.

[21] Appl. No.: 406,378

[22] Filed: Mar. 17, 1995

[51] Int. Cl.$^6$ ................................. G06F 13/00
[52] U.S. Cl. ................ 395/200.06; 395/200.14; 395/200.19; 370/213; 370/319; 370/913
[58] Field of Search ................ 350/172; 371/32; 370/85.2, 85.3, 85.13, 213, 319, 913; 375/1; 395/200, 200.14, 200.19

[56] References Cited

U.S. PATENT DOCUMENTS

| 4,841,527 | 6/1989 | Raychaudhuri et al. | 371/32 |
| 5,321,542 | 6/1994 | Freitas et al. | 350/172 |
| 5,379,290 | 1/1995 | Kleijne | 370/85.2 |
| 5,390,181 | 2/1995 | Campbell et al. | 370/85.2 |
| 5,422,887 | 6/1995 | Diepstraten et al. | 370/85.3 |

FOREIGN PATENT DOCUMENTS

| 0196347 | 8/1986 | European Pat. Off. . |
| 0483548 | 6/1992 | European Pat. Off. . |
| 0589106 | 3/1994 | European Pat. Off. . |

OTHER PUBLICATIONS

Elmirghani and Cryan, "Indoor Infrared wireless networks utilising PPM CDMA", Aug. 1994, pp. 334–337.

Sugiyama and Nosu, "MPPM: A Method for Improving the Band Utilization Efficiency in Optical PPM", 1989, pp. 465–472.

Barry, John R., Kahn, Joseph M., Lee, Edward A., and Messerschmitt, David g., *High–Speed Nondirective Optical Communication for Wireless Networks*, IEEE Network Magazine, Nov. 1991, pp. 44–54.

International Search Report (PCT Rule 44.1), from the International Searching Autority, dated Nov. 9, 1996.

*Primary Examiner*—Thomas C. Lee
*Assistant Examiner*—Le Hien Luu
*Attorney, Agent, or Firm*—Blakely, Sokoloff, Taylor & Zafman

[57] ABSTRACT

A method and apparatus for detecting and indicating a collision on a wireless channel are provided. According to the method, data is transmitted over the wireless channel using pulse position modulation. The channel is monitored during each pulse position modulation frame to determine whether a pulse occurs during more than one pulse window of the pulse position modulation frame. If a pulse occurs during more than one pulse window of a pulse position modulation frame, then the devices on the wireless channel determine that a collision has occurred. A transceiver is disclosed for connecting a device to a wire-based network via a wireless connection. The device and transceiver communicate over the wireless connection using pulse position modulation. If a collision occurs on the wire-based network, then the transceiver transmits to the device a signal in which pulses are asserted during more than one pulse window of a pulse position modulation frame. The signal, which violates standard pulse position modulation rules, indicates to the device that a collision occurred.

8 Claims, 7 Drawing Sheets 5,692,127

SYSTEM FOR TRANSMITTING MULTIPLE PULSES PPM CONTROL SIGNAL TO WIRELESS DEVICE TO INDICATE COLLISION IN A WIRED NETWORK WHILE PLACING DATA ON THE NETWORK

FIELD OF THE INVENTION

The present invention relates to data communications networks, and more specifically, to a method and apparatus for detecting and indicating network collisions over a wireless connection.

BACKGROUND OF THE INVENTION

A local area network (LAN) typically consists of a number of stations, computers and peripherals that are connected together via a cabled network in order to exchange data. The recent popularity of portable computers and their associated peripherals, such as printers, telephone modems, and scanners, has created the need for ad hoc data networking in which connections to a network can be made and broken in a relatively easy fashion.

In the past, for a portable computer to send information to the devices on a network, a user had to manually connect the portable computer to the physical cables that carried the network's signals. Before moving the portable computer to another location, the user had to first manually disconnect the portable computer from the network's cables. The need to manually connect and disconnect portable computers in this manner tended to make the portable computers less mobile and convenient.

Consequently, wireless technologies have been developed to eliminate the need for manual connections. For example, wireless technologies have been developed which transmit data via radio frequency (RF) signals, infra-red signals, ultrasonic signals and near field signals. Through the use of wireless technologies, portable computers can easily "connect" into a network simply by being placed in proximity to a device that supports the wireless communication and that is already part of the network.

Each type of wireless technology has its own set of characteristics. For example, ultrasound networks tend to have very low data rates. In contrast, radio frequency (RF) networks provide relatively high data rates (10s of Megabits per second) over relatively long distances (hundreds of feet). RF networks have the disadvantage that RF technology tends to be the most expensive wireless technology. In addition, RF networks are subject to government regulations which vary substantially from one country to the next.

Infrared (IR) connections typically fall into one of two categories. The first category of IR connection is a low cost, short range (a few feet), line-of-sight connection between two IR capable devices. The second category of IR connection is a higher cost, longer range (30–40 feet), diffuse, omnidirectional connection between IR capable devices. Infra-red systems have advantages over RF systems in that data transmitted over IR signals is relatively secure, and IR is generally cheaper than wireless radio links.

Using IR technology, a point-to-point connection between two devices may be constructed for very low cost, with one or two emitter LEDs. If more range is desired, infrared emitters may be added to increase signal strength, at the expense of increased power requirements and cost. Diffuse systems, which have the largest expanse of range, may require up to 10 emitters to fully cover a room.

At present, the most common network access protocols include token passing, carrier sense-multiple access with collision detection (CSMA-CD) and asynchronous transfer mode (ATM). In the token passing scheme, an individual entity on the network can transmit data packets only when a packet containing a "token" is received. Each station is allotted a limited amount of time before giving up the token to the next station. This provides for "determinism" in that if the maximum number of stations on a given network is known, then it is possible to calculate the maximum delay between the last transmit and the next transmit period for a given station.

According to the CSMA-CD method, each station listens to determine whether the network trunk is busy, and then transmits as soon as the "busy" indication goes away. If a collision is detected, a timer set with a random seed is started. When the timer counts down to zero, the station is allowed to transmit again if the line is not busy. If another collision is detected, the timer is set to a larger value. This process continues, with the timer increasing exponentially with each collision, until the station gets access and the problem is resolved.

The interface between the transceiver and the computer in the wire network consists of three pairs: collision, transmit data and receive data. This interface is referred to as the attached unit interface (AUI). Data is typically sent between the computer and the transceiver as Manchester encoded data. The transceiver acts as a translator between the two wire network backbone and the three wire AUI interface. When a collision, defined as two stations simultaneously transmitting, is sensed by the transceiver on the network bus, the transceiver is required to output a 20 Mhz square wave on the collision pair. This signal lets the station know that collision occurred.

When a transceiver transmits on the network backbone, it impresses a DC offset level in addition to the balanced Manchester code used to encode the data and clock. Collision is sensed on the wire network typically by monitoring the DC level on the cable. A device detects that a collision has occurred when the DC offset level is monitored as going over the threshold for two transmitting stations together. When a collision is sensed, the Ethernet protocol requires that the transceiver enforce the collision by transmitting a "jam" signal on the network backbone.

FIG. 1 illustrates a CSMA-CD wire network 100. CSMA-CD wire network 100 includes three stations 102, 104 and 106 physically coupled to a plurality of transceivers 110, 112 and 114 by a plurality of AUI cables 116, 118 and 120, respectively. Transceivers 110, 112 and 114 are physically connected to a network "backbone" cable 108.

On the CSMA-CD wire network 100, when a station is transmitting, it causes the transceiver to which it is connected to superimpose a DC offset on the cable 108 in addition to the transmitted data. A collision takes place when two or more transceivers attempt to send data over cable 108 at the same time. Because each of the transceivers that are sending data is creating its own offset in addition to the data, multiple active transceivers will result in an increased offset on cable 108. This increased offset is sensed by the transceivers on the cable 108 as a collision indication. The transceivers 110, 112 and 114 which are clamped to the cable 108 then pass a collision sense signal over their respective AUI cables 116, 118 and 120 to their respective stations 102, 104 and 106. Collision detection is extremely important to the overall throughput capability of the network to ensure that the transmitting station will not hold the network bus for the entire length of the transmitted (collided) packet.

To take advantage of wireless technology, the AUI cable that connects a station to a transceiver may be replaced by a wireless connection. For example, assume that station 102 is a portable computer. If AUI cable 116 is replaced with a wireless connection, then station 102 may easily be added to and removed from network 100. However, for a wireless connection to replace the AUI cable 116, the wireless connection must provide the equivalent of a collision detection channel in addition to transmit data and receive data channels.

One approach to providing a collision detection signal over a wireless connection is described in U.S. Pat. No. 5,321,542 issued to Freitas, et. al. This approach calls for transmitting "control" signals on a physically different wavelength than the data channel. A collision detect signal could be one such control signal. This approach has the disadvantage that it requires two optical filters, two photo detectors, two receiver amplifier chains, and two different wavelength emitters.

Based on the foregoing, it is clearly desirable to provide a less expensive method and apparatus for providing a wireless network connection that supports a collision detection signal. It is further desirable to provide a wireless network that supports CSMA-CD access methods. It is further desirable to provide a method and apparatus capable of sending over a wireless connection an indication of a collision as a part of the data stream without the necessity of a separate optical channel and its attendant hardware and increased component count.

SUMMARY OF THE INVENTION

According to one aspect of the invention, a method for detecting a collision on a channel that carries information between a plurality of devices over a wireless medium is provided. According to the method, the channel is monitored during a sequence of consecutive pulse windows referred to as a pulse position modulation frame. After monitoring the channel, it is determined whether the channel carried pulses during more than one pulse window of the sequence of consecutive pulse windows. If the channel carries pulses during more than one pulse window of the sequence of consecutive pulse windows, then it is determined that a collision has occurred. If the channel does not carry pulses during more than one pulse window of the sequence of consecutive pulse windows, then it is determined that a collision has not occurred.

According to another aspect of the invention, a method that allows a device that has been instructed to transmit data on a wireless channel during one pulse window of a pulse position modulation frame to detect a collision on the channel is provided. According to the method, the device monitors the channel during all pulse windows of the pulse position modulation frame other than the one pulse window during which it is to send data. The device determines whether the channel carries any pulses during a pulse window of the pulse position modulation frame other than the one pulse window during which it sends data. If the channel carries a pulse during a pulse window of the sequence of consecutive pulse windows other than the one pulse window, then the device determines that a collision has occurred. Otherwise, the device determines that a collision has not occurred.

According to another aspect of the invention, a method for transmitting a collision indication to a device that is coupled to a wired network through a wireless connection is provided. According to the method, data is received over the wireless connection from the device. The data is encoded in a pulse position modulation channel consisting of a series of pulse position modulation frames. Each pulse position modulation frame consists of more than one pulse window. After receiving the data, the data is placed on a backbone cable of the wired network. It is then determined whether a collision occurred while placing the data on the backbone cable. This determination may be performed, for example, by placing a DC offset on the backbone cable, and then sensing the DC offset to determine if any other device also imposed a DC offset on the backbone cable. If a collision occurred while placing the data on the backbone cable, then a control signal is transmitted over the wireless connection to the device. The control signal is a pulse position modulation channel in which a pulse is sent during more than one pulse window of a pulse position modulation frame.

According to another aspect of the invention, an apparatus for detecting a collision on a channel that carries information between more than one device over a wireless medium is provided. The apparatus includes a monitoring mechanism, a processing mechanism, and a transmission mechanism. The monitoring mechanism is configured to monitor the channel during a pulse position modulation frame. In an infrared-based network, the monitoring mechanism may include, for example, a light detector. The processing mechanism determines whether the channel carries pulses during more than one pulse window of the pulse position modulation frame. The processing mechanism determines that a collision has occurred if the channel carries pulses during more than one pulse window of the pulse position modulation frame. The mechanism determines that a collision has not occurred if the channel does not carry pulses during more than one pulse window of the pulse position modulation frame. The transmission mechanism is configured to generate a jam signal on the channel when the processing mechanism determines that a collision has occurred. In an infrared-based network, the transmission mechanism may be, for example, a light emitting diode.

According to another aspect of the invention, an apparatus for use in a device that has been instructed to transmit a pulse during one pulse window of a pulse position modulation frame on a channel that carries information between more than one devices over a wireless medium is provided. The apparatus includes a monitoring mechanism, a processing mechanism and a transmission mechanism. The monitoring mechanism is configured to monitor the channel during all pulse windows of the pulse position modulation frame other than the one pulse window in which the device is to send data. The processing mechanism determines whether the channel carries any pulses during a pulse window of the pulse position modulation frame other than the one pulse window. The processing mechanism determines that a collision has occurred if the channel carries a pulse during a pulse window of the pulse position modulation frame other than the one pulse window. The processing mechanism determines that a collision has not occurred if the channel does not carry any pulses during a pulse window of the pulse position modulation frame other than the one pulse window. The transmission mechanism is configured to generate a jam signal on the channel when the processing mechanism determines that a collision has occurred.

According to yet another aspect of the present invention, a transceiver for connecting a device to a wired network through a wireless connection is provided. The transceiver includes a wireless signal detection mechanism, an interface, a transmission mechanism, a collision detection mechanism and a wireless signal generation mechanism.

The wireless signal detection mechanism is configured to receive data over the wireless connection from the device.

The data is encoded in a pulse position modulation channel consisting of a series of pulse position modulation frames. Each pulse position modulation frame consists of more than one pulse window. The interface physically couples the transceiver to a backbone cable of the wired network. The transmission mechanism places the data on a backbone cable of the wired network. The collision detection mechanism determines if a collision occurred while placing the data on the backbone cable. The wireless signal generation mechanism transits a control signal over the wireless connection to the device if a collision occurred while placing the data on the backbone cable. The control signal is a pulse position modulation channel in which a pulse is sent during more than one pulse window of a pulse position modulation frame.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Pulse Position Modulation

In the presently preferred embodiment of the invention, data is sent over wireless connections using pulse position modulation (PPM). In PPM, the time it takes to transit a single symbol is referred to as a PPM frame. Each PPM frame is divided up into a fixed number of pulse windows. For any given PPM scheme, the number of pulse windows in a PPM frame is 2^N, where N is the number of bits being encoded in each symbol.

Figure 4:
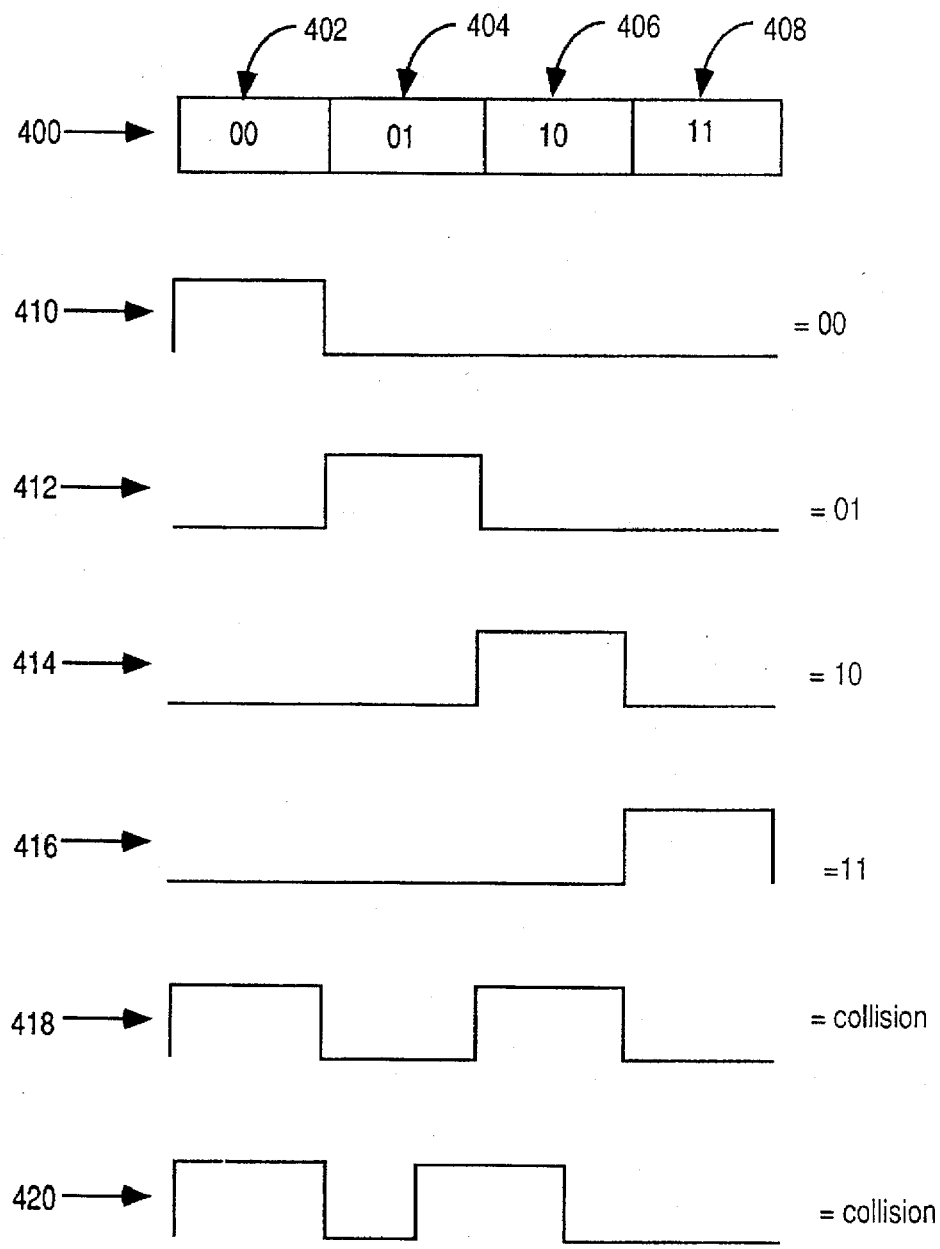
FIG. 4 illustrates PPM-4 encoding and code violations used to indicate or detect collisions according to the present invention.

FIG. 4 illustrates a PPM scheme that may be utilized by the present invention to provide collision detection over wireless network connections. In the illustrated PPM scheme, each symbol represents two bits of information. Therefore, the PPM frame 400 is divided up into four (2^2) pulse windows 402, 404, 406 and 408. Each pulse window is associated with a symbol that represents the value of two bits. In the present example, pulse windows 402, 404, 406 and 408 are associated with '00', '01', '10' and '11' respectively.

A device communicates information using PPM by transmitting a pulse during the pulse window that corresponds to the symbol that represents the information. For example, the signal 410, in which a pulse is sent during pulse window 402, communicates the value '00'. In a similar manner, signals 412, 414 and 416 communicate the values '01', '10' and '11', respectively. A receiving device decodes the PPM signals by measuring the time between each pulse received and the previous received pulse. The symbol is then decoded according to the pulse window in which it arrived.

Collision Detection Using Pulse Position Modulation

The symbol encoding rules of PPM allow pulses during only one pulse window of each PPM frame, as explained above. According to the present invention, signals that include multiple pulses in a single PPM frame, which would otherwise be PPM code violations, are used to signify special control characters. Once such control character may indicate a collision condition. For example a signal 418, which carries pulses during both pulse windows 402 and 406 of a single PPM frame, can represent a network collision. By communicating network collisions by this technique, a station receiving the signal 418 is made aware that a collision has occurred within one PPM frame of the collision.

Wireless PPM Connections To Wire Networks

Figure 1:
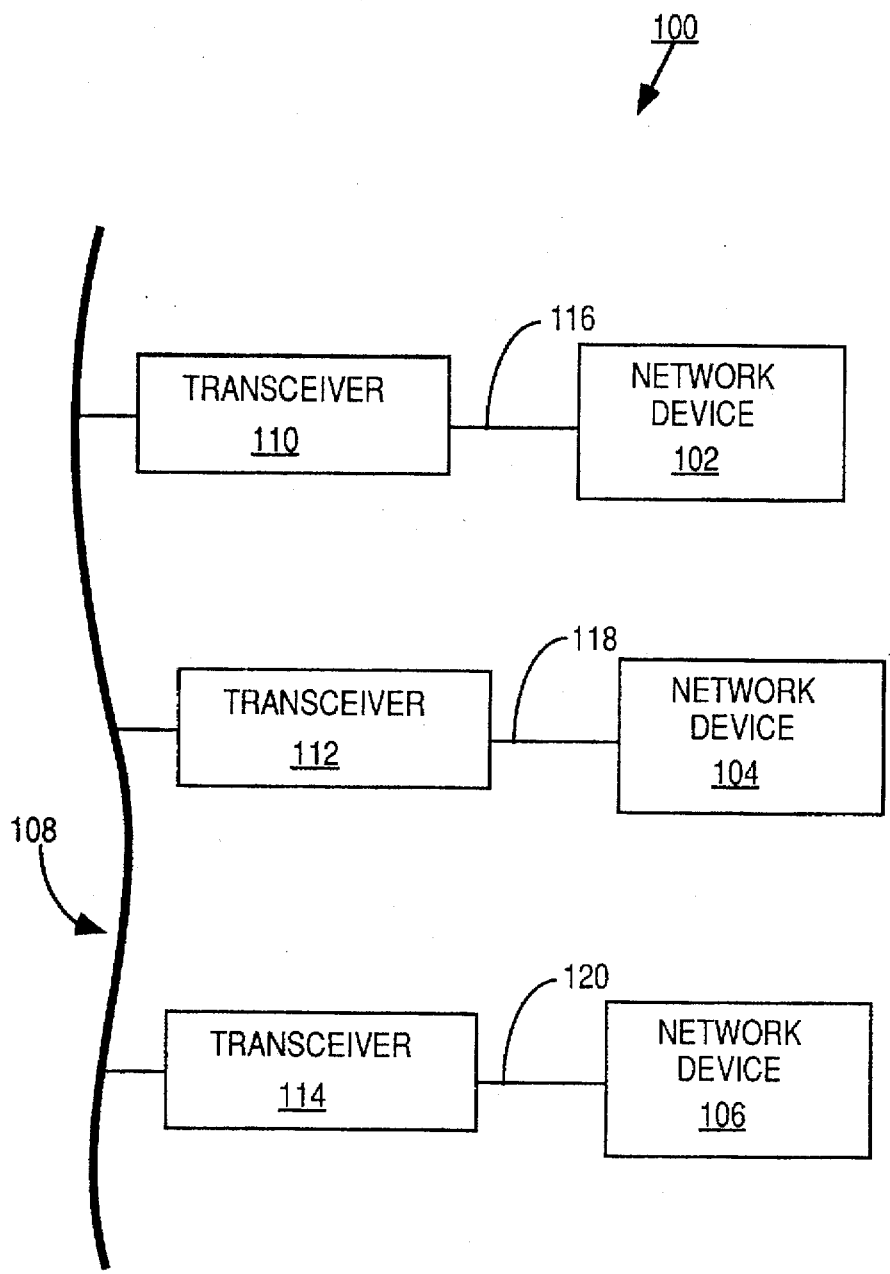
FIG. 1 is a block diagram of a portion of a prior art CSMA-CD network.
Figure 2:
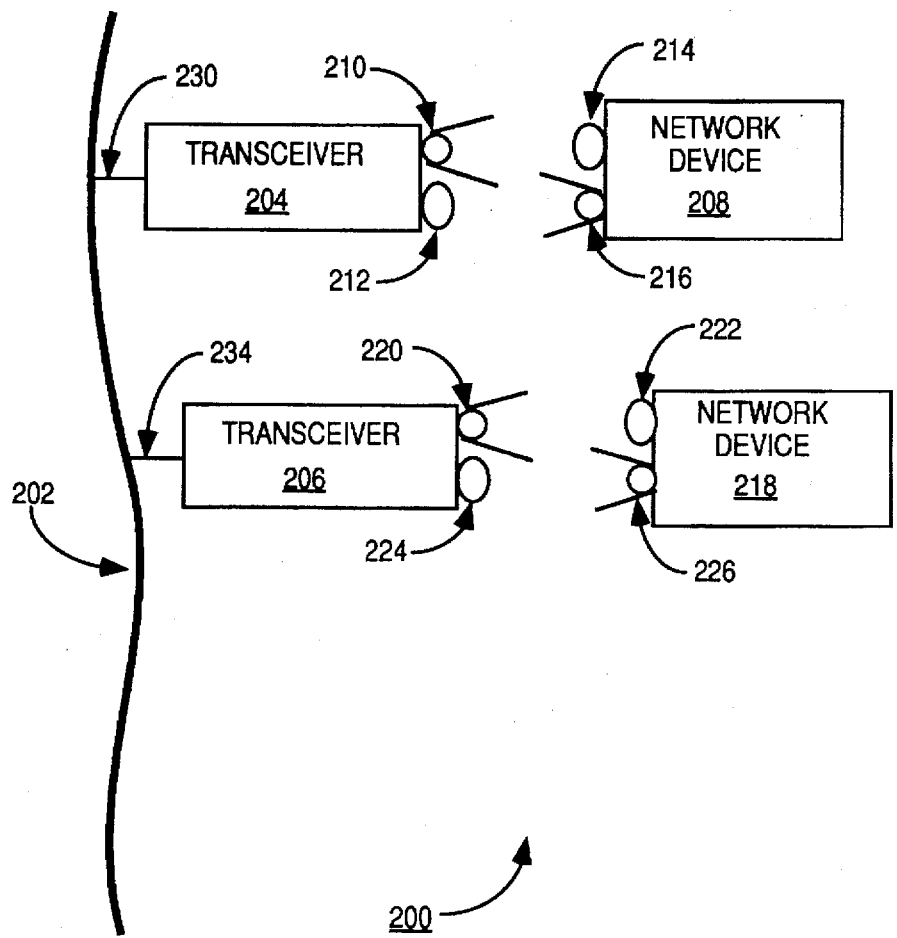
FIG. 2 is a block diagram of a plurality of portable computers connected to the cable backbone of a wire-based network over wireless connections.

Referring to FIG. 2, it illustrates a wired network 200 that includes a plurality of transceivers 204 and 206 physically connected to a network backbone cable 202. Transceiver 204 is physically connected to cable 202 via a BNC connector 230 and optically coupled to a network device 208. Transceiver includes an IR emitter 210 for transmitting information to network device 208, and a photo detector 212 for receiving information from network device 208. Similarly, network device 208 has an IR emitter 216 for sending information to transceiver 204, and a photo detector 214 for receiving information from transceiver 204. Specifically, the photo detector 212 of transceiver 204 detects light transmitted from the IR emitter 216 of network device 208, and the photo detector 214 of network device 208 detects light transmitted from the IR emitter 210 of transceiver 204.

Transceiver 206 is physically connected to cable 202 via a BNC connector 234 and optically coupled to a network device 218. Transceiver includes an IR emitter 220 for transmitting information to network device 218, and a photo detector 224 for receiving information from network device 218. Similarly, network device 218 has an IR emitter 226 for sending information to transceiver 206, and a photo detector 222 for receiving information from transceiver 206. Specifically, the photo detector 224 of transceiver 206 detects light transmitted from the IR emitter 226 of network device 218, and the photo detector 222 of network device 218 detects light transmitted from the IR emitter 220 of transceiver 206.

To transmit data over wired network 200, network device 208 drives IR emitter 216 to send light pulses that encode the data using PPM encoding. Transceiver 204 detects the signals with photo detector 212, and transmits the data onto cable 202. When transmitting data to cable 202, transceiver 204 applies a DC offset to the cable 202. Transceiver 204 senses the DC offset on cable 202 to determine if another device (i.e., transceiver 206) was placing data on cable 202 at the same time. If so, transceiver 204 determines that a collision has occurred. Transceiver 204 then drives IR emitter 210 to send to network device 208 a control symbol that indicates the occurrence of a collision. As explained above, such a control signal may be any signal in which a pulse is sent during more than one pulse window of a single PPM frame. Signal 418 of FIG. 4 represents one possible "collision" signal for a PPM-4 encoding scheme.

Figure 7:
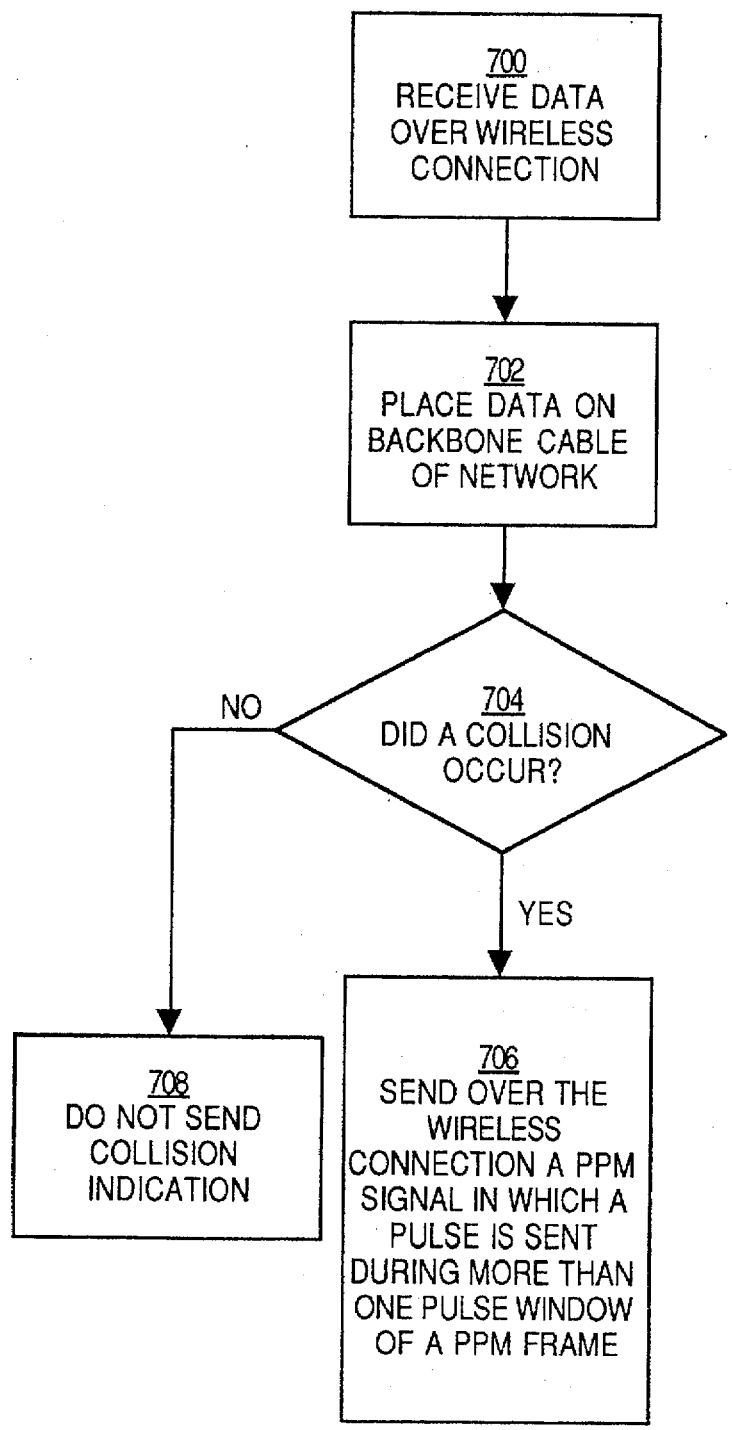
FIG. 7 is a flow chart that illustrates a method for indicating the occurrence of a collision to a device coupled to a wire-based network via a wireless connection.

FIG. 7 is a flow chart that illustrates a method for transmitting a collision indication to a device that is coupled to a wired network through a wireless connection. The method would be performed by the interface mechanism that is physically connected to the wired network, and that is connected to the device via the wireless connection. For example, transceiver 204 would perform the method to indicate to network device 208 the occurrence of collisions on cable 202.

At step 700, data is received over the wireless connection from the device. The data is encoded in a PPM signal consisting of a series of PPM frames. As explained above, each PPM frame consists of a plurality of pulse windows. At step 702, the data is placed on a backbone cable of the wired network. At step 704, it is determined whether a collision occurred while placing the data on the backbone cable. If a collision did not occur, control passes to step 708 and no collision indication is sent to the transmitting network device. If a collision occurred while placing the data on the backbone cable, then a control signal is sent over the wireless connection to the device at step 706. The control signal is a PPM signal in which a pulse is sent during more than one pulse window of a PPM frame. The control signal is easily distinguishable from data because only one pulse window of a PPM frame that encodes data contains a pulse.

PPM-Based Wireless Networks

Figure 3:
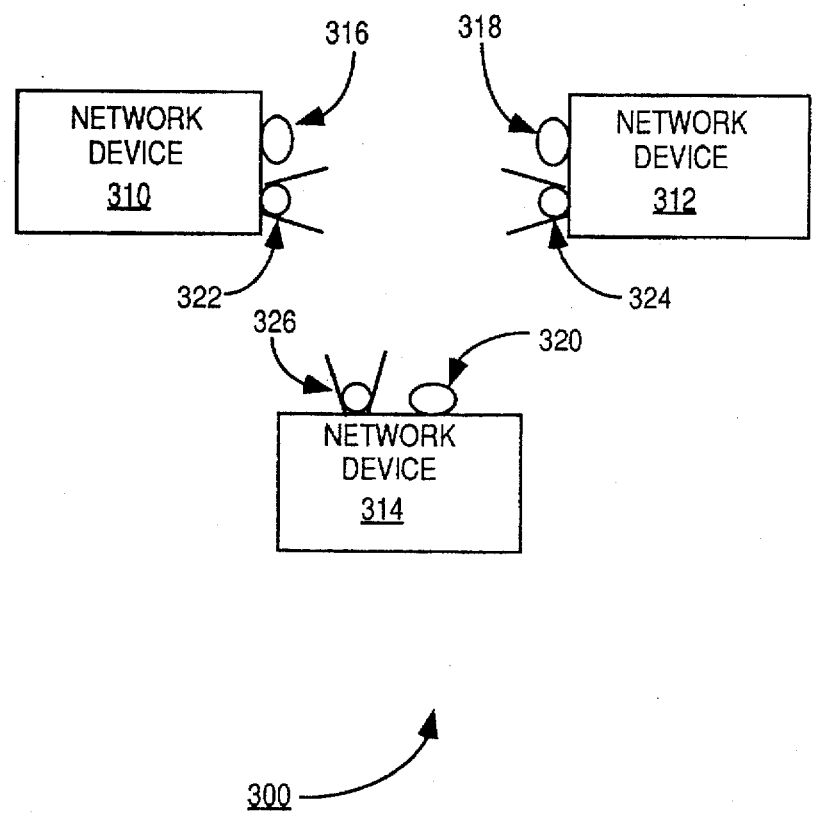
FIG. 3 is a block diagram of an independent wireless network that includes portable computers equipped with IR transceivers.

Referring to FIG. 3, it illustrates a wireless network 300 according to an alternative embodiment of the present invention. Wireless network 300 includes a plurality of network devices 310, 312 and 314. Network devices 310, 312 and 314 may be, for example, portable computers, modems or printers.

Each of network devices 310, 312 and 314 is configured with an IR emitter and a photo detector. Network devices 310, 312 and 314 are arranged in such a way as to allow the photo detectors on each of the network devices to sense the light pulses sent by every other one of the network devices on network 300. Specifically, the photo detector 316 of network device 310 can detect the light pulses sent by the IR emitters 324 and 326 of network device 312 and 314. The photo detector 318 of network device 312 can detect the light pulses sent by the IR emitters 326 and 322 of network devices 314 and 310. The photo detector 320 of network device 314 can detect the light pulses sent by IR emitters 322 and 324 of network devices 310 and 312.

In the preferred embodiment, all of the devices on network 300 communicate with each other using PPM. As explained above, a PPM transmitting device communicates information by sending one pulse per PPM frame. Therefore, if more than one device on network 300 attempts to send data over network 300 during a given PPM frame, the signal during the given PPM frame will include one pulse for each transmitting device. Consequently, a collision situation can be detected when any station observes two pulses within a single PPM frame. Due to differences in crystal frequencies and imperfect phase synchronization, pulses generated by separate devices will extend beyond a given pulse window even if both of the pulses are intended to be sent during the given pulse window. Signal 420 of FIG. 4 represents such a collision situation.

Similarly, a collision situation can be detected by a station that transmits information during a given PPM frame by causing the station to detect whether the network 300 carried any other pulse during the given PPM frame. For example, consider the situation in which network device 310 is going to transmit a pulse in the third pulse window of a given PPM frame. If the photo detector 316 of network device 310 detects a pulse in any other pulse window of the given PPM frame, then network device 310 would construe this situation as a collision. Having detected a collision, network device 310 would respond by transmitting a "jam" signal (e.g. a square wave for a period of eight PPM frames) over network 300 to reinforce the collision. Note that network device 310 would detect a collision even if the pulse detected by photo detector 316 occurs in a pulse window prior to the pulse window during which network device 310 was to send a pulse (i.e. the third pulse window).

Figure 5:
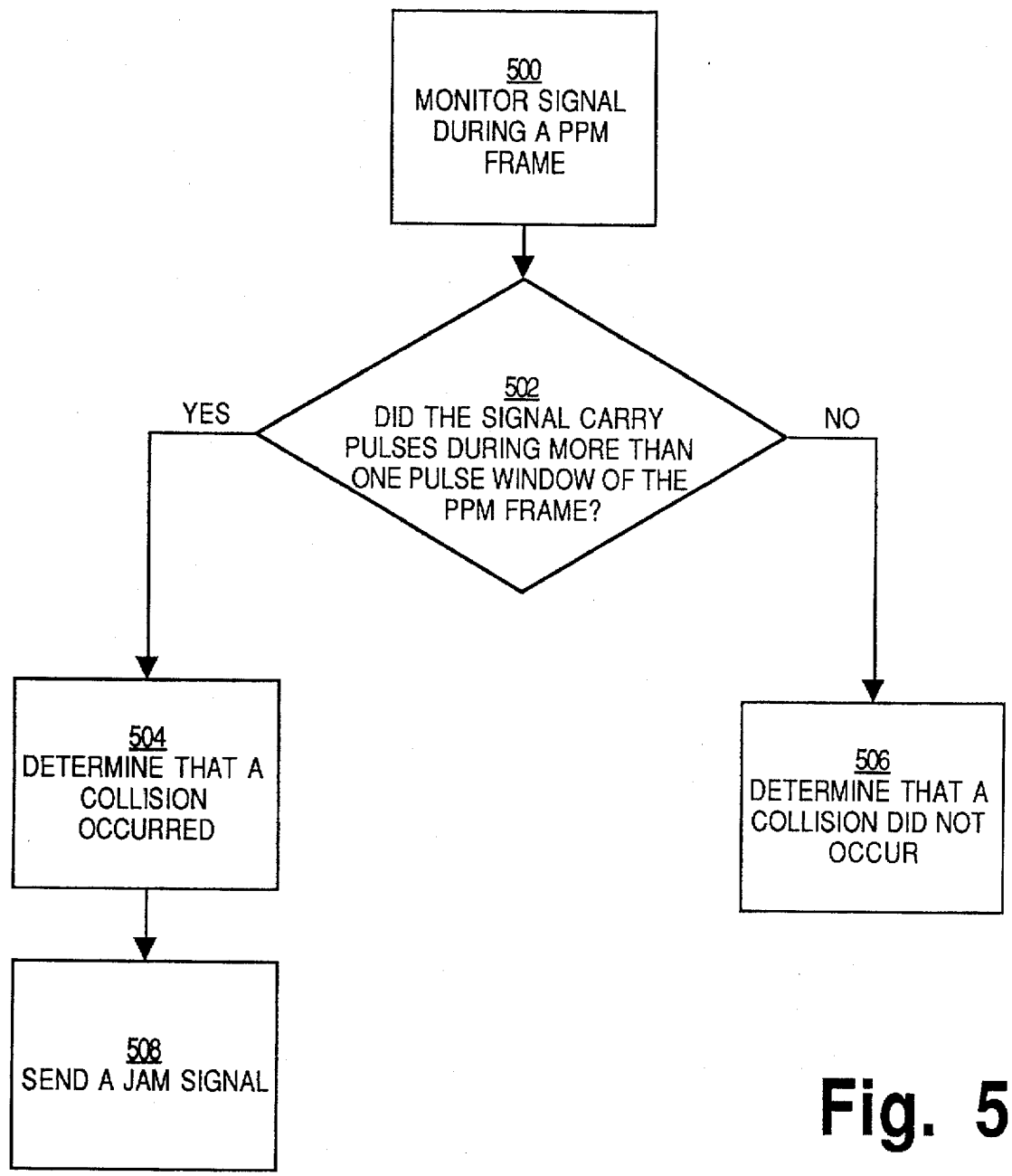
FIG. 5 is a flow chart that illustrates a method for a device coupled to a wireless network to detect collisions.

FIG. 5 is a flow chart illustrating a method for detecting a collision on a signal that carries information between a plurality of devices over a wireless medium, such as wireless network 300. The method may be performed by any device that is coupled to the wireless medium. At step 500, the signal is monitored during a sequence of consecutive pulse windows. Preferably, the sequence of consecutive pulse windows constitutes one PPM frame. At step 502, it is determined whether the signal carries pulses during more than one pulse window of the sequence of consecutive pulse windows. If the signal carries pulses during a plurality of pulse windows of the sequence of consecutive pulse windows, then it is determined that a collision has occurred, at step 504. At step 508 a jam signal is sent to enforce the collision. If the signal does not carry pulses during more than one pulse windows of the sequence of consecutive pulse window, then it is determined that a collision has not occurred at step 506.

Figure 6:
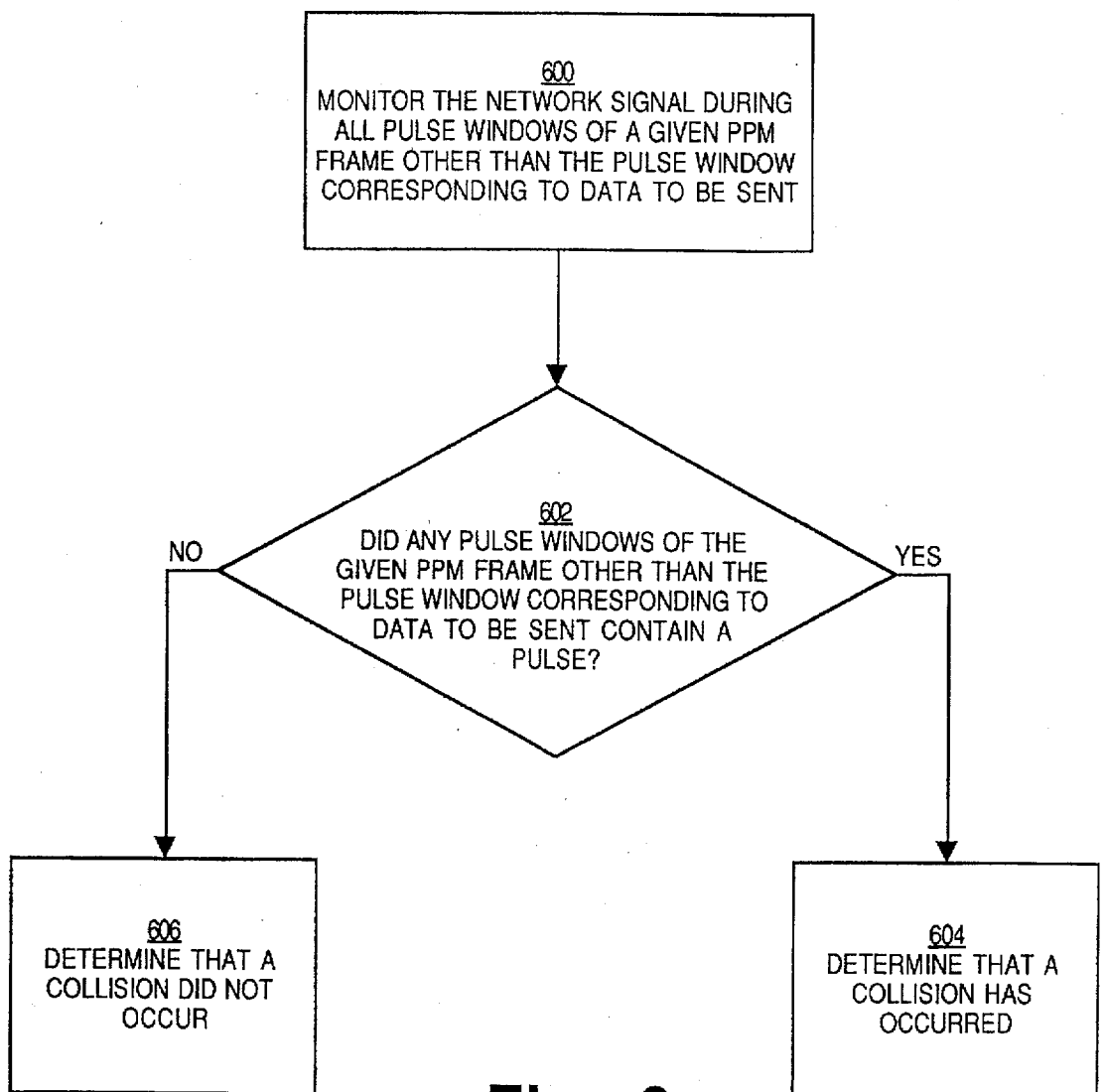
FIG. 6 is a flow chart that illustrates a method for a device that intends to send data over a wireless network to detect whether a collision occurred during the transmission of the data.

FIG. 6 is a flow chart illustrating an alternative method for detecting a collision on a signal that carries information between a plurality of devices over a wireless medium. The method shown in FIG. 6 is performed by a device that is going to transit information during a given pulse window of a given PPM frame. At step 600, the device monitors the signal during all pulse windows of the sequence of consecutive pulse windows other than the given pulse window. At step 602, the device determines whether the signal carries pulses during a pulse window of the sequence of consecutive pulse windows other than the given pulse window. If the signal carries pulses during a pulse window of the sequence of consecutive pulse windows other than the one pulse window, then the device determines that a collision has occurred at step 604. If the signal does not carry pulses during a pulse window of the sequence of consecutive pulse windows other than the one pulse window, then the device determines that a collision has not occurred at step 606.

As explained in the foregoing description, the present invention provides a method and apparatus for generating collision detect indications over wireless connections without requiring a separate transmission channel for collision detect signals. The invention may be implemented to conveniently connect portable devices to wire-based networks, or to create entirely wireless CSMA-CD networks.

While specific embodiments of the present invention have been described, various modifications and substitutions will become apparent to one skilled in the art by this disclosure. Such modifications and substitutions are within the scope of the present invention, and are intended to be covered by the following claims.

What is claimed is:

1. A method for transmitting a collision indication to a device that is coupled to a wired network through a wireless connection, the method comprising the steps of:

receiving data over said wireless connection from said device, wherein said data is encoded in a pulse position modulation signal consisting of a series of pulse position modulation frames, wherein each pulse position modulation frame consists of a plurality of pulse windows;

placing said data on a backbone cable of said wired network;

determining if a collision occurred while placing said data on said backbone cable; and if a collision occurred while placing said data on said backbone cable, then transmitting a control signal over said wireless connection to said device, wherein said control signal is a pulse position modulation signal in which a pulse is sent during more than one pulse window of a pulse position modulation frame.

2. The method of claim 1 wherein the step of determining if a collision occurred while placing said data on said backbone cable includes the steps of:

imposing a dc offset on said backbone cable; and monitoring said dc offset on said backbone cable.

3. The method of claim 1 wherein:

said step of receiving data includes detecting light pulses transmitted by said device; and said step of transmitting a control signal includes transmitting light pulses to said device.

4. A transceiver for connecting a device to a wired network through a wireless connection, the transceiver comprising:

a wireless signal detection mechanism configured to receive data over said wireless connection from said device, wherein said data is encoded in a pulse position modulation signal consisting of a series of pulse position modulation frames, wherein each pulse position modulation frame consists of a plurality of pulse windows;

an interface that is physically coupled to a backbone cable of said wired network;

a transmission mechanism for placing said data on a backbone cable of said wired network;

a collision detection mechanism for determining if a collision occurred while placing said data on said backbone cable; and a wireless signal generation mechanism for transmitting a control signal over said wireless connection to said device if a collision occurred while placing said data on said backbone cable, wherein said control signal is a pulse position modulation signal in which a pulse is sent during more than one pulse window of a pulse position modulation frame.

5. The transceiver of claim 4 wherein said collision detection mechanism includes:

a mechanism for imposing a dc offset on said backbone cable, and a mechanism for monitoring said dc offset.

6. The transceiver of claim 4 wherein:

said wireless signal detection mechanism is an infrared detector; and said wireless signal generation mechanism is an infrared emitter.

7. A computer system comprising:

a portable processing unit comprising:

an emitter configured to transmit data over a wireless connection, and a detector configured to receive data that is encoded in a sequence of pulse position modulation frames over said wireless connection, wherein each pulse position modulation frame includes a plurality of pulse windows; and a transceiver optically coupled to the portable processing unit and physically coupled to a wired network, wherein the transceiver comprises:

a wireless signal detection mechanism configured to receive data over the wireless connection from said portable processing unit, an interface that is physically coupled to a backbone cable of said wired network, a transmission mechanism for placing said data on a backbone cable of said wired network, a collision detection mechanism for determining if a collision occurred while placing said data on said backbone cable, and a wireless signal generation mechanism for transmitting a control signal over said wireless connection to said portable processing unit if a collision occurred while placing said data on said backbone cable, wherein said control signal is a pulse position modulation signal in which a pulse is sent during more than one pulse window of a pulse position modulation frame.

8. The computer system of claim 7 wherein:

said wireless signal detection mechanism is an infrared detector; and said wireless signal generation mechanism is an infrared emitter.

* * * * *